(12) United States Patent
Sakamoto

(10) Patent No.: US 6,234,731 B1
(45) Date of Patent: May 22, 2001

(54) ANGLE SPINDLE ATTACHMENT WITH TOOL CHUCKING DEVICE

(75) Inventor: Shigetomo Sakamoto, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,809

(22) Filed: Feb. 25, 2000

(30) Foreign Application Priority Data

Feb. 25, 1999 (JP) .................................................. 11-047608

(51) Int. Cl.[7] ................................ B23C 7/00; B23Q 3/12
(52) U.S. Cl. .......................... 409/144; 409/215; 409/230; 409/233
(58) Field of Search ............................... 483/39; 409/144, 409/215, 230, 231, 233

(56) References Cited

U.S. PATENT DOCUMENTS

| | | | |
|---|---|---|---|
| 2,987,969 | * 6/1961 | Morton | 409/233 |
| 3,163,081 | * 12/1964 | Vickers | 409/230 |
| 4,671,712 | * 6/1987 | Sellner et al. | 409/215 |

* cited by examiner

Primary Examiner—Daniel W. Howell
(74) Attorney, Agent, or Firm—Pillsbury Winthrop LLP

(57) ABSTRACT

An angle spindle attachment includes a spindle shaft 21 for mounting a tool detachably, a housing 20 for mounting the spindle shaft rotatably such that the spindle shaft is oriented to a different direction with respect to the drive shaft 3 of the spindle unit, a gear train for transmitting the drive power of the spindle unit to the spindle shaft of the angle spindle attachment. a collet means 29 for retaining and releasing the tool that is movable between a position for retaining the tool and a position for releasing the tool so as to interlock the rotation of the spindle shaft, and a switching means 24,16 for switching the collet means between a operative condition to permit the tool to be retained and released and an inoperative condition for mounting the tool undetachably.

6 Claims, 6 Drawing Sheets

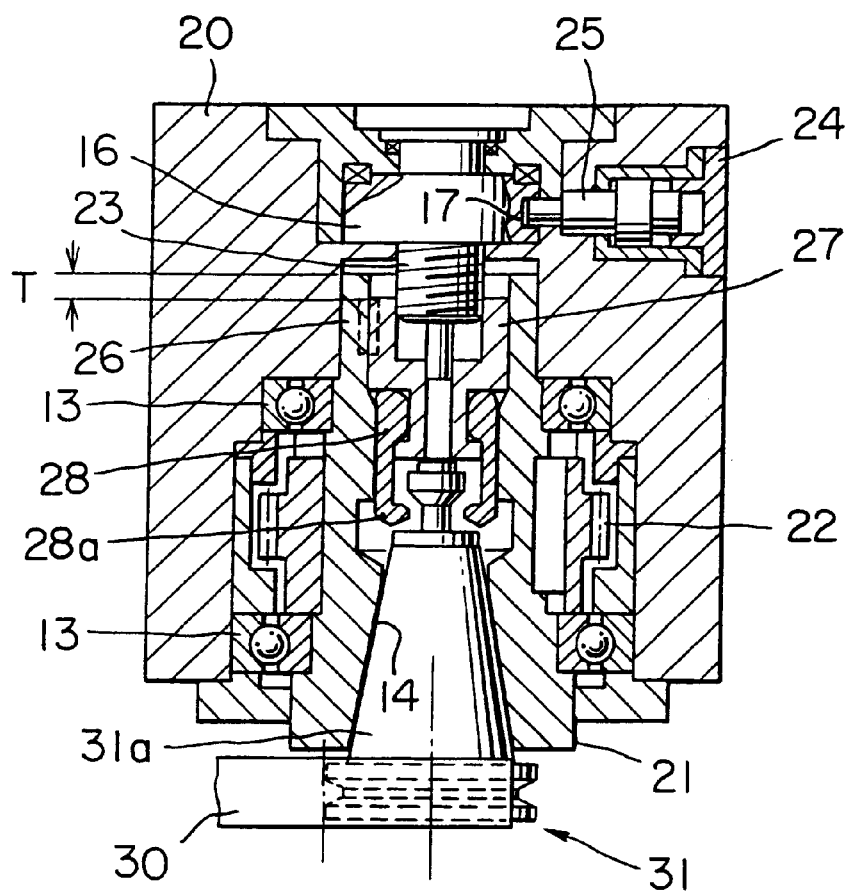
F I G. 3 (A)
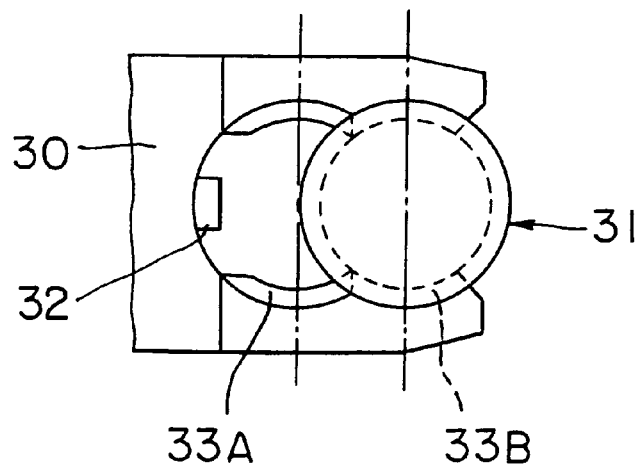
F I G. 3 (B)

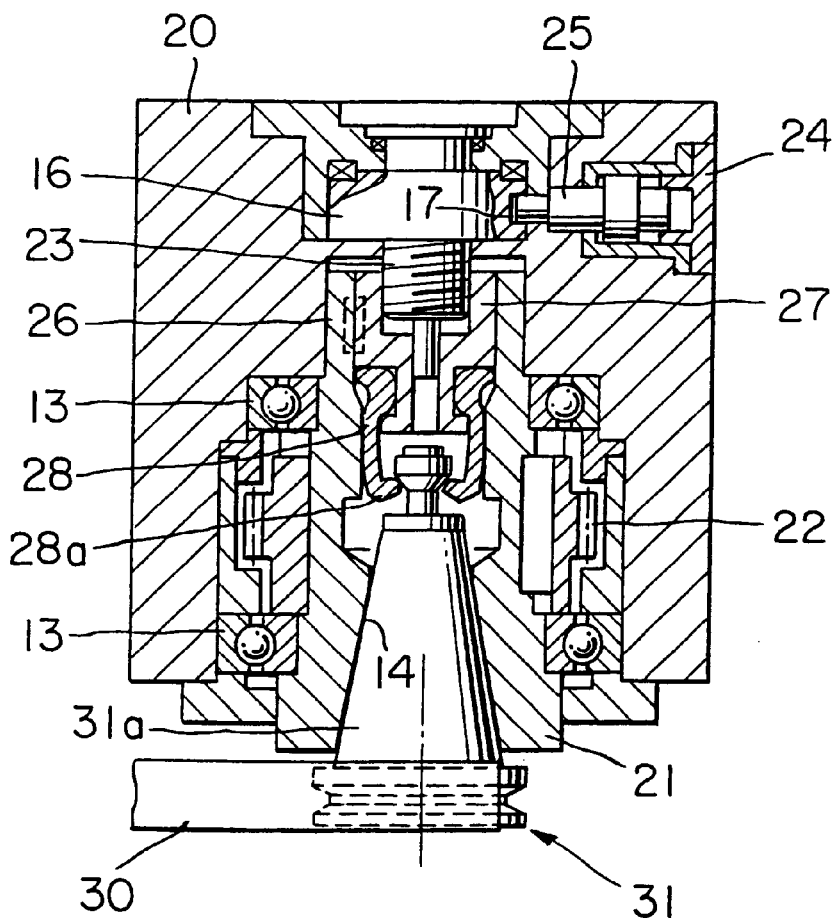
F I G. 4 (A)
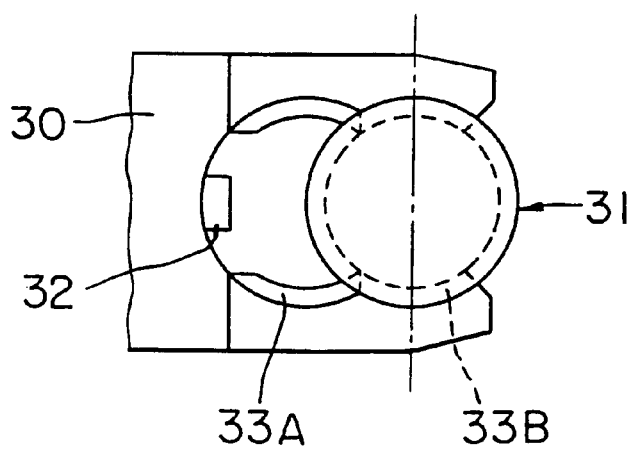
F I G. 4 (B)

ANGLE SPINDLE ATTACHMENT WITH TOOL CHUCKING DEVICE

BACKGROUND OF THE INVENTION

1. Field of the Invention

The present invention relates to an angle spindle attachment with an automatic tool chucking device that is operable with a different angle with respect to a axis of a spindle unit of a machine tool.

2. Description of the Related Art

Angle spindle attachments for spindle units are known in the prior art, for example, U.S. Pat. No. 5,697,739. FIG. 6 shows a conventional angle spindle attachment that is connected to a spindle unit of a machine tool in a vertical orientation. The angle spindle attachment has a housing 1 in which an angle head spindle 2 (referred to as a spindle shaft 2 hereinafter) is rotatably mounted via bearings. The spindle shaft 2 is driven for rotation by a drive shaft 3 included in the spindle unit of the machine tool through a angle gear train including of a pair of bevel gears 4, 5 mounted on the drive shaft 3, spindle shaft 2 respectively. A draw bar assembly 6 is mounted in the spindle shaft 2 that includes a tool holder gripping means such as a collet 7. The draw bar assembly 6 is generally biased by belleville springs 8 to an gripping position so as to hold the tool holder in a tapered bore of the spindle shaft 2. When the draw bar 6 is forced downward by a cylinder 9 with a rod 10 connected thereto, as viewed in FIG. 6, against the bias of the belleville springs 8, the collet 7 is moved form the gripping position to a releasing position indicated by two-dot chain lines 7a to remove the tool holder from the spindle shaft 2.

A problem and disadvantage of the prior art angle spindle attachment is that the tool holder must be attached or removed to/from the spindle shaft 2 by a operator manually. A further problem with the prior art is that draw bar assembly 6 and the cylinder 9 increases inconveniently a axial length L of the housing 1 inconveniently.

SUMMARY OF THE INVENTION

Accordingly, it is an object of the present invention to provide a compact angle spindle attachment capable of permitting an automatic tool changing operation.

With the foregoing object in view, an angle spindle attachment for a spindle unit of a machine tool that carries out machining in a direction different from a axial direction in which a drive shaft of the spindle unit extends comprises a spindle shaft for mounting a tool detachably; a housing for mounting the spindle shaft rotatably such that the spindle shaft is oriented to a different direction with respect to the drive shaft of the spindle unit; a gear train for transmitting the drive power of the spindle unit to the spindle shaft of the angle spindle attachment; a collet means for retaining and releasing the tool that is movable between a position for retaining the tool and a position for releasing the tool so as to interlock the rotation of the spindle shaft; and a switching means for switching the collet means between a operative condition to permit the tool to be retained and released and an inoperative condition for mounting the tool undetachably.

BRIEF DESCRIPTION OF THE DRAWINGS

The above and other objects, features and advantages of the present invention will become more apparent from the following description taken in connection with the accompanying drawings, in which:

FIG. 3A is a longitudinal sectional view of the angle spindle attachment shown in FIG. 1A in a state where the collet is opened and a tool is inserted in the collet;

FIG. 3B is an end view of the angle spindle head in a state where the tool is gripped by the gripping member;

FIG. 4A is a longitudinal sectional view of the angle spindle attachment shown in FIG. 1A in a state where the tool is gripped by the collet;

FIG. 4B is an end view of the angle spindle attachment shown in FIG. 1A in a state where the tool is gripped by the gripping member;

DESCRIPTION OF THE PREFERRED EMBODIMENTS

Figure 1:
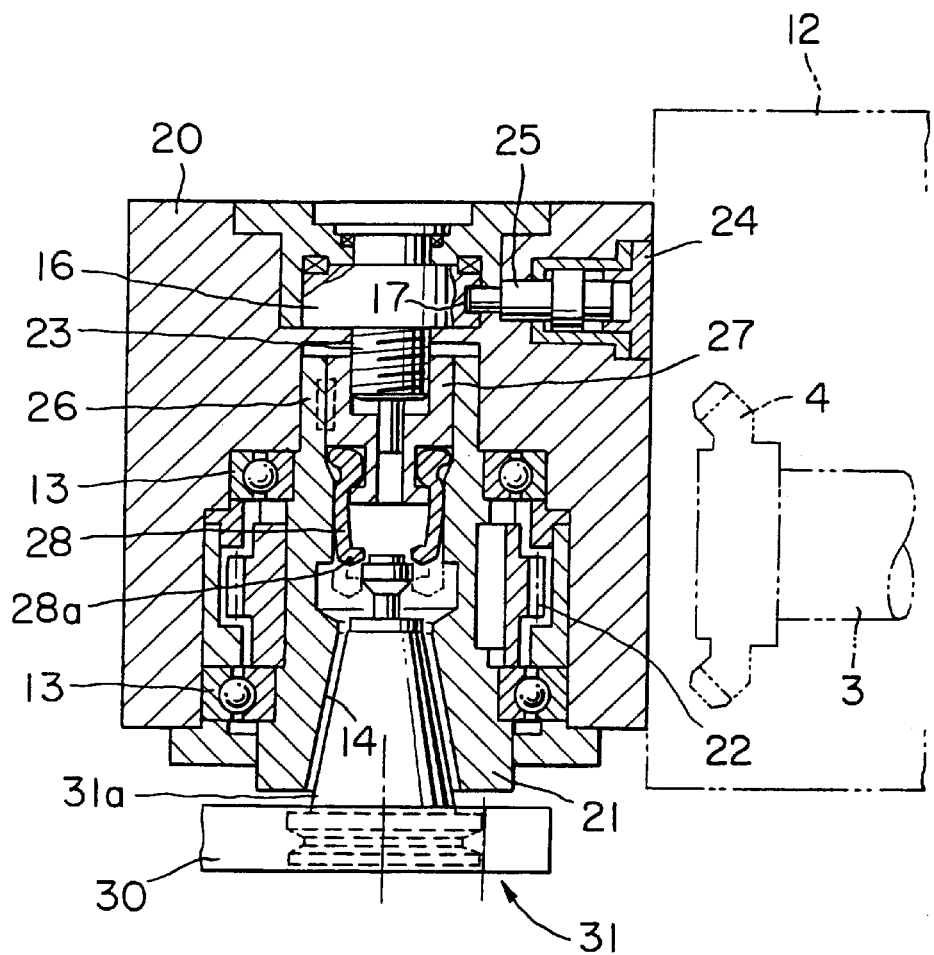
FIG. 1A is a longitudinal sectional view of an angle spindle attachment in a preferred embodiment according to the present invention.
FIG. 1B is an end view of the angle head shown in FIG. 1.
Figure 1:
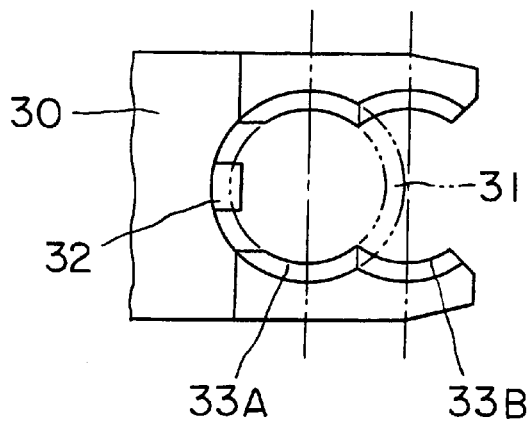

FIG. 1 shows an angle spindle attachment in a preferred embodiment of the present invention. The numeral 12 generally designates a portion of a spindle unit of a machine tool on which the angle spindle attachment is mounted. The spindle unit 12 includes a hollow drive shaft 3 which is driven by a driving mechanism (not shown) mounted on the machine tool.

The angle spindle attachment includes a housing 20. A vertically oriented spindle shaft 21 with respect to the drive shaft 3 is rotatably mounted in the housing 20 through bearings 13. A tapered bore 14 for receiving a tapered shank 31a of the tool holder 31 is formed in the front end of the spindle shaft 14. A driven gear 22 is mounted on and keyed to the spindle shaft 21. An angle gear train includes the driven gear 22 and a bevel gear 4 mounted on the front end of the drive shaft 3. The driving mechanism included in the machine tool, not shown, drives the drive shaft 3, and the rotational power is transmitted to the gear train to drive the spindle shaft 21 for rotation.

A Rotatable cylindrical member 16 is disposed co-axially with the spindle shaft 21 in the rear end of the housing 20. The rotatable cylindrical member 16 has a screw portion 23 integrally therewith. A switching cylinder 24 is mounted vertically with the cylindrical member 16 in the housing 20. A notch 17 is formed in a circumferential surface of the cylindrical member 16 that can be engaged with the front end of a piston rod 25 of the switching cylinder 24 to hold the cylindrical member 16 in a fixed rotational position. The screw portion 23 can selectively be restrained from rotation by advancing a piston rod 25 into the notch 17 or allowed to rotate by retracting the piston rod 25 from the notch 17.

A releasable collet means is disposed in a bore of the spindle shaft 21. The releasable collect means includes a collet body 28 which is axially movable in the bore of the spindle shaft 21, and a drive nut member 27 provided with an internal thread engaged with the external thread of the screw portion 23. The collet body 28 is retained on the front end of the drive nut member 27. The drive nut member 27 is connected to the spindle shaft 21 with a key 26 so as to move axially relative to the spindle shaft 21 and rotate together with the spindle shaft 21. The drive nut 27 which is engagement with the screw portion 23 convert the rotational motion to axial reciprocating motion of the collet body 28 in case where the cylindrical member 16 is restrained from turning by the piston rod 25 inserted into the notch 17 formed therein. The collet body 28 is actuated within the spindle shaft 21 for either releasing the tool holder 31 or retaining the same.

FIG. 1B shows a gripping member 30 for gripping the tool holder in different two ways. The gripping member 30 is attached to a tool changing arm included in a automatic tool changer, not shown. The gripping member 30 has a first grip 33A for gripping the tool holder 31 detachably and unrotatably that is provided with a whirl-stop 32 on a inner surface. The gripping member has a second grip 33B for griping the tool holder 31 detachably and rotatably. The gripping member 30 can be moved in the direction perpendicular to the axis of the spindle shaft 21 so as to shift the gripping position between the first grip 33A and the second grip 33B When the spindle shaft 21 is rotated to grip the tool holder 31 by the collet body 29, the gripping member 30 is moved left in FIG. 1A to shift the tool gripping position from first grip 33A to the second grip 33B. When the gripping member 30 seizes the tool holder 31 by the first grip 33A, the whirl-stop 32 engages with a groove on a flange of the taper shank to prevent the tool holder 31 from rotating.

Figure 2A:
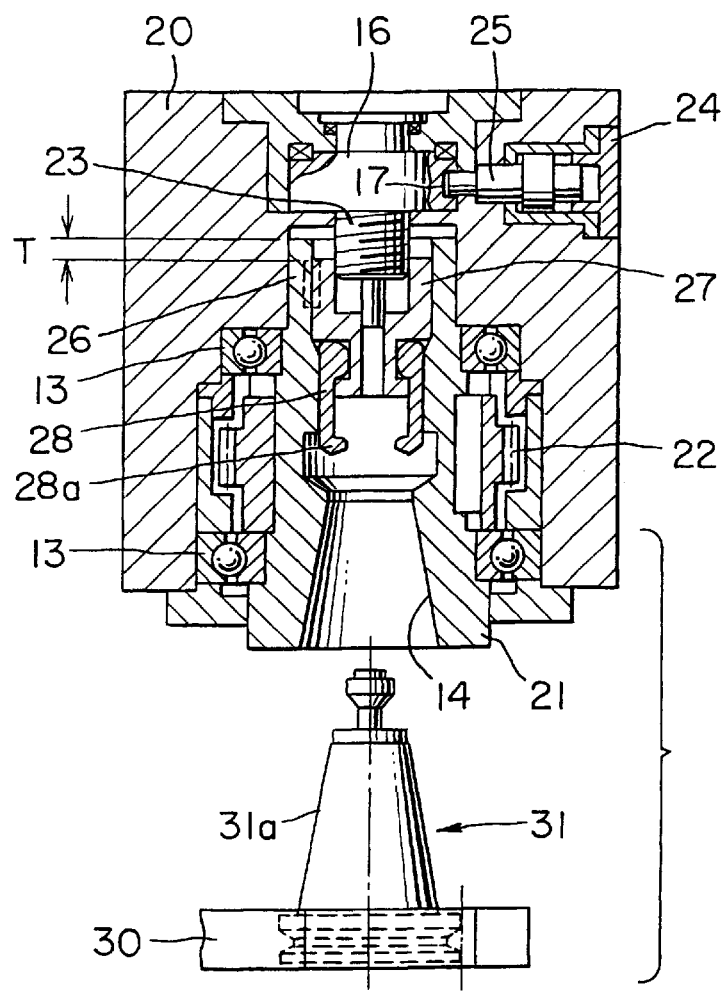
FIG. 2A is a longitudinal sectional view of the angle spindle attachment shown in FIG. 1A in a state where a collet is open.
Figure 2B:
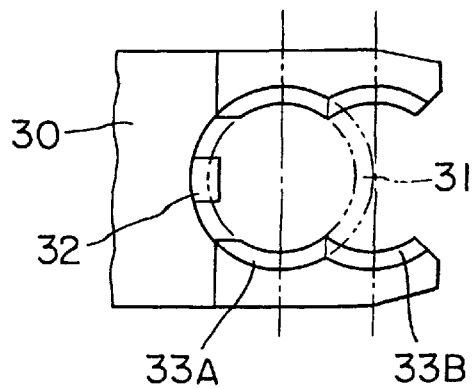
FIG. 2B is an end view of the angle spindle attachment shown in FIG. 1B in a state where a tool is gripped by a gripping member.

A tool mounting operation will be described hereafter. When the switching cylinder 24 is actuated, the front end of the piston rod 25 is engages with the notch 17 on the cylindrical member 16 as shown in FIG. 2A to restrain the screw portion 23 from rotation. Then, the spindle shaft 21 is rotated through the gear train by the spindle unit 12 of the machine tool. Consequently, the screw portion 23 operates to move the drive nut member 27 downward relative to the spindle shaft 21, as viewed in FIG. 2A by a distance T so that the collet body 28 is pushed downward to the position represented by the numeral 28a where the collet body 29 is opened.

Figure 5:
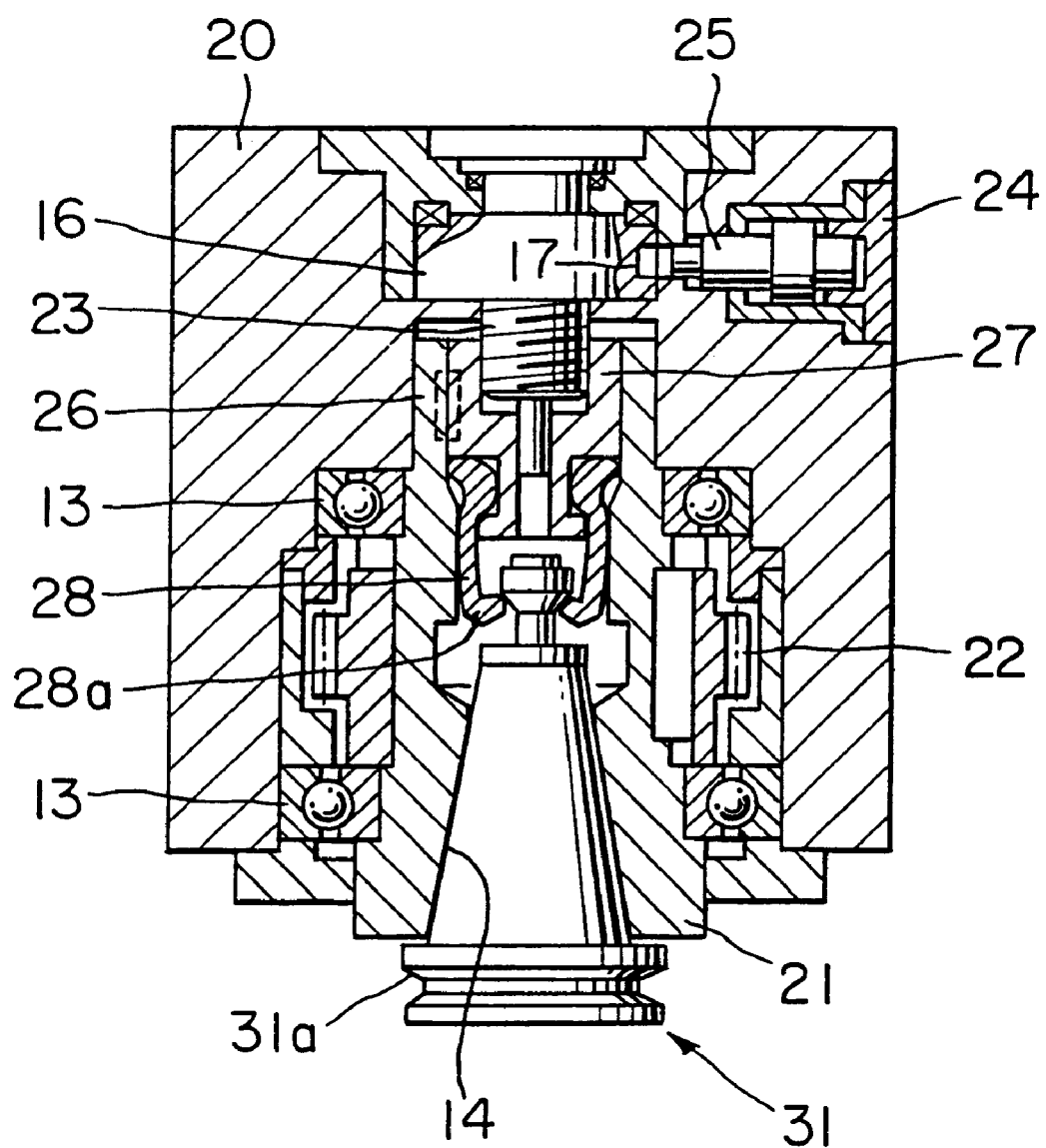
FIG. 5 is a longitudinal sectional view of an angle spindle attachment in a preferred embodiment according to the present invention.
Figure 6:
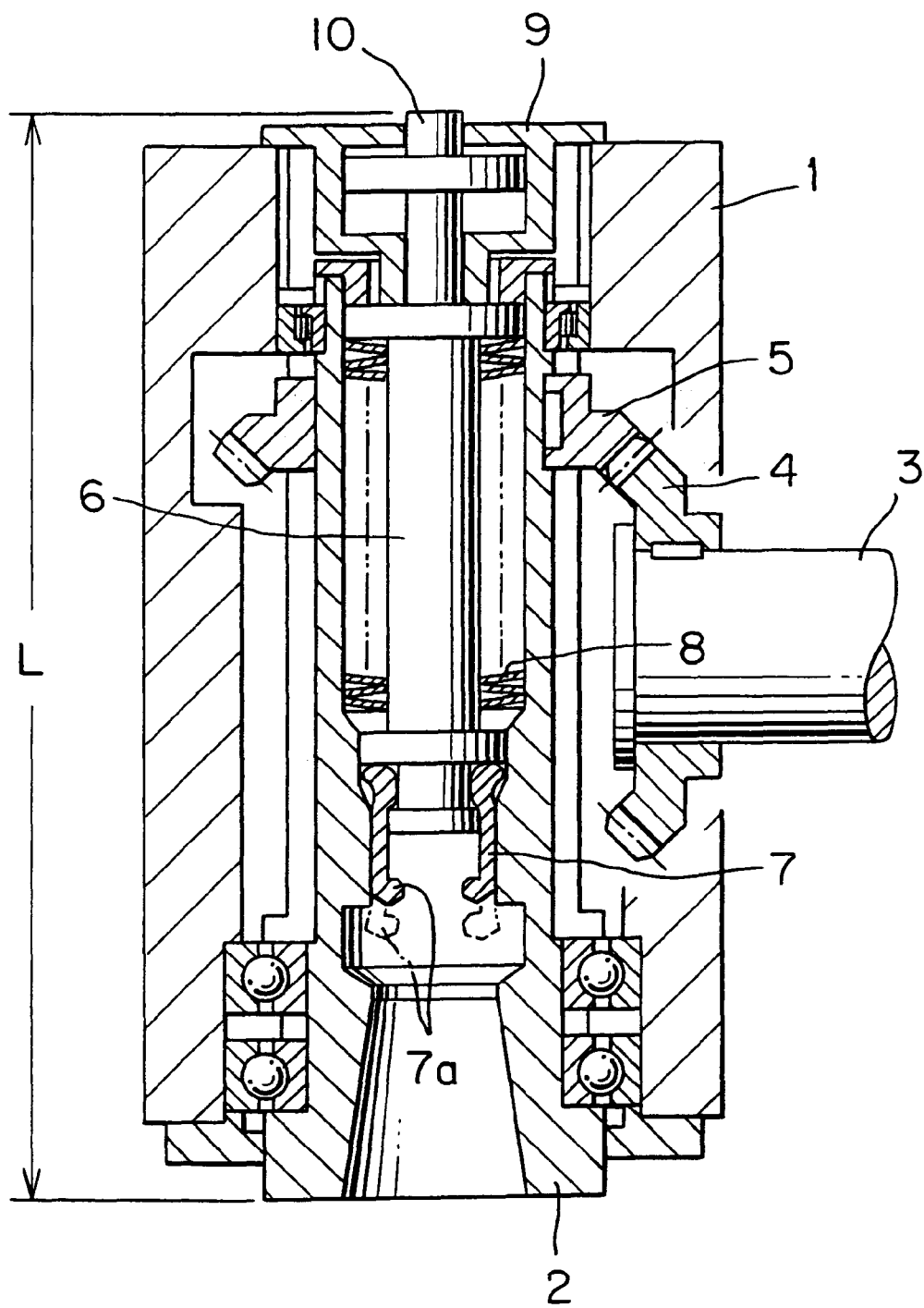
FIG. 6 is a longitudinal sectional view of a conventional angle spindle attachment.

Subsequently, the gripping member 30 carries a tool from a tool magazine, not shown, and seizes the tool holder 31 unrotatably by the first grip 33A as shown in FIG. 2A, and inserts the tapered shank 31a of the tool holder 31 into the tapered bore 14 of the spindle shaft 21 as shown in FIG. 3A. Then, the griping member 30 re-grip the tool holder 31 rotatably by the second grip 33B, shifting left to disengage the whirl-stop 32 from the tool holder 31 in preparation for a subsequent tool gripping operation by the collet body 29. Next, the spindle shaft 21 is rotated in the reverse direction to move upward the drive nut member 27 relative to the spindle shaft 21 in engagement with the screw portion 23, as viewed in FIG. 3A by a distance T so that the collet body 28 reaches to the retaining position where the pull stud of the tool holder 31 is gripped firmly by the collet body 29 as shown in FIG. 4A Then, as shown in FIG. 5, the tool changing arm is operated to move the gripping member 30 to a position where the gripping member 30 may not interfere with the spindle shaft 21, and the piston rod 25 of the switching cylinder 24 is retracted to allow the disengagement with the notch 17 so that the screw portion 23 is able to rotate integrally with drive nut 27 and spindle shaft 21 while machining operations. Thus, the tool chucking operation is completed.

A tool removing operation for removing the tool holder 31 from the spindle shaft 21 will be described hereafter. In the state shown in FIG. 5, the piston rod 25 of the switching cylinder 24 is advanced into the notch 17 on the cylindrical member 16 to restrain the screw portion 23 from rotation. Then, the gripping member 30 seizes the tool holder 31 by the second grip 33b in a state shown in FIG. 4A. Then, the drive nut member 27 is rotated integrally with the spindle shaft 21 to move the same downward so that the collet body 28 retracts to the releasing position, as viewed in FIG. 4A by the distance T where the collet body 29 is opened as shown in FIG. 3A. In this state, the gripping member 30 moves from a position shown in FIG. 3B to the right to re-grip the tool holder 31 unrotatably by the first grip 33A and removes the tool 31 from the spindle shaft 21 as shown in FIG. 2A. Thus, the tool removing operation is completed.

In this embodiment, the arrangement direction for the first and second grip 33A, 33B is perpendicular to the axis of the spindle shaft 21. It will be seen that the gripping member 30 may have a arrangement for the first and second grip 33A, 33B in a direction parallel to the axis of the spindle shaft 21.

As apparent from the foregoing description, the angle spindle attachment has a short axial length and can be operated by the driving device of the machine for automatic tool changing operation.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An angle spindle attachment for a spindle unit of a machine tool that carries out machining in a direction different from a axial direction in which a drive shaft of the spindle unit extends, said attachment comprising:
    a spindle shaft for mounting a tool detachably;
    a housing for mounting the spindle shaft rotatably such that the spindle shaft is oriented to a different direction with respect to the drive shaft of the spindle unit;
    a gear train for transmitting the drive power of the spindle unit to the spindle shaft of the angle spindle attachment;
    a collet means for retaining and releasing the tool that is movable between a position for retaining the tool and a position for releasing the tool so as to interlock the rotation of the spindle shaft; and
    a switching means for switching the collet means between a operative condition to permit the tool to be retained or released and an inoperative condition for mounting the tool undetachably.

2. The angle spindle attachment according to claim 1, wherein the collet means comprises a screw member for being selectively fixed stationary or allowed to rotation, a drive nut member for engaging with the screw member that is axially movable in the spindle shaft as the spindle shaft is rotated, and a collet body for retaining or releasing the tool as the drive nut member is moved axially.

3. The angle spindle attachment according to claim 2, wherein the switching means comprises a rotatable cylindrical member having the screw portion integrally therewith and a notch in a circumferential surface thereof, and a switching cylinder having a piston rod engageable with the notch to selectively restrain the cylindrical member from rotation.

4. The angle spindle attachment according to claim 1, further comprising a gripping member having a first grip for gripping the tool detachably and unrotatably and a second grip for griping the tool holder (31) detachably and rotatably.

5. The angle spindle attachment according to claim 4, wherein an arrangement direction of the first and second grip is perpendicular to the axial direction of the spindle shaft.

6. The angle spindle attachment according to claim 4, wherein an arrangement direction of the first and second grip is parallel to the axial direction of the spindle shaft.

* * * * *